United States Patent
Kissel

(10) Patent No.: US 7,246,227 B2
(45) Date of Patent: Jul. 17, 2007

(54) EFFICIENT SCANNING OF STREAM BASED DATA

(75) Inventor: Timo S. Kissel, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 1075 days.

(21) Appl. No.: 10/364,252

(22) Filed: Feb. 10, 2003

(65) Prior Publication Data

US 2004/0158732 A1 Aug. 12, 2004

(51) Int. Cl.
G06F 11/00 (2006.01)
G06F 17/30 (2006.01)

(52) U.S. Cl. .............................. 713/22; 713/23; 713/26
(58) Field of Classification Search ................. 713/23, 713/22, 26
See application file for complete search history.

(56) References Cited

U.S. PATENT DOCUMENTS

| | | |
|---|---|---|
| 5,398,196 A | 3/1995 | Chambers |
| 5,452,442 A | 9/1995 | Kephart |
| 5,495,607 A | 2/1996 | Pisello et al. |
| 5,572,590 A | 11/1996 | Chess |
| 5,675,710 A | 10/1997 | Lewis |
| 5,694,569 A | 12/1997 | Fischer |
| 5,826,249 A | 10/1998 | Skeirik |
| 5,832,208 A | 11/1998 | Chen et al. |
| 5,832,527 A | 11/1998 | Kawaguchi |
| 5,854,916 A | 12/1998 | Nachenberg |
| 5,884,033 A | 3/1999 | Duvall et al. |
| 5,944,821 A | 8/1999 | Angelo |
| 5,974,549 A | 10/1999 | Golan |
| 6,006,242 A | 12/1999 | Poole et al. |
| 6,021,510 A | 2/2000 | Nachenberg |
| 6,023,723 A | 2/2000 | McCormick et al. |
| 6,052,709 A | 4/2000 | Paul |
| 6,072,942 A | 6/2000 | Stockwell et al. |
| 6,088,803 A | 7/2000 | Tso et al. |
| 6,092,194 A | 7/2000 | Touboul |
| 6,094,731 A | 7/2000 | Waldin et al. |
| 6,125,459 A | 9/2000 | Andoh et al. |

(Continued)

FOREIGN PATENT DOCUMENTS

EP 0636977 A2 2/1995

(Continued)

OTHER PUBLICATIONS

David V. Schuehler, James Moscola, John Lockwood, Architecture for a Hardware Based, TCP/IP Content Scanning System, IEEE Micro, Jan./Feb. 2004.*

(Continued)

*Primary Examiner*—David Jung
(74) *Attorney, Agent, or Firm*—Fenwick & West LLP

(57) ABSTRACT

Methods, systems, and computer readable media utilize a stream manager (101) to efficiently scan stream (105) based data (103). A stream manager (101) receives (801) data (103) from a stream (105). The stream manager (101) makes (807) received data (103) serially available to a plurality of modify scanners (109) in a specific order, and makes (809) received data (103) available in parallel to a plurality of read-only scanners (111). The stream manager (101), responsive to data (103) having been released by each modify scanner (109) of the plurality and by each read-only scanner (111) of the plurality, transmits (515) released data (103) to a destination (113).

54 Claims, 9 Drawing Sheets

U.S. PATENT DOCUMENTS

| | | | |
|---|---|---|---|
| 6,161,130 | A | 12/2000 | Horvitz et al. |
| 6,167,434 | A | 12/2000 | Pang |
| 6,253,169 | B1 | 6/2001 | Apte et al. |
| 6,298,351 | B1 | 10/2001 | Castelli et al. |
| 6,347,310 | B1 | 2/2002 | Passera |
| 6,370,526 | B1 | 4/2002 | Agrawal et al. |
| 6,397,200 | B1 | 5/2002 | Lynch et al. |
| 6,397,215 | B1 | 5/2002 | Kreulen et al. |
| 6,401,122 | B1 | 6/2002 | Matsui et al. |
| 6,421,709 | B1 | 7/2002 | McCormick et al. |
| 6,424,960 | B1 | 7/2002 | Lee et al. |
| 6,442,606 | B1 | 8/2002 | Subbaroyan et al. |
| 6,456,991 | B1 | 9/2002 | Srinivasa et al. |
| 6,493,007 | B1 | 12/2002 | Pang |
| 6,502,082 | B1 | 12/2002 | Toyama et al. |
| 6,505,167 | B1 | 1/2003 | Horvitz et al. |
| 6,546,416 | B1 | 4/2003 | Kirsch |
| 6,721,721 | B1 | 4/2004 | Bates et al. |
| 6,751,789 | B1 | 6/2004 | Berry et al. |
| 6,772,346 | B1 | 8/2004 | Chess et al. |
| 6,842,861 | B1 | 1/2005 | Cox et al. |
| 6,886,099 | B1 | 4/2005 | Smithson et al. |
| 6,944,555 | B2 | 9/2005 | Blackett et al. |
| 6,952,779 | B1 | 10/2005 | Cohen et al. |
| 6,973,578 | B1 | 12/2005 | McIchionc |
| 7,024,403 | B2 | 4/2006 | Kyler |
| 2002/0035693 | A1 | 3/2002 | Eyres et al. |
| 2002/0038308 | A1 | 3/2002 | Cappi |
| 2002/0046207 | A1 | 4/2002 | Chino et al. |
| 2002/0073046 | A1 | 6/2002 | David |
| 2002/0087649 | A1 | 7/2002 | Horvitz |
| 2002/0138525 | A1 | 9/2002 | Karadimitriou et al. |
| 2002/0147694 | A1 | 10/2002 | Dempsey et al. |
| 2002/0147782 | A1 | 10/2002 | Dimitrova et al. |
| 2002/0178375 | A1 | 11/2002 | Whittaker et al. |
| 2002/0194488 | A1 | 12/2002 | Cormack et al. |
| 2002/0194489 | A1 | 12/2002 | Almogy et al. |
| 2002/0199186 | A1 | 12/2002 | Ali et al. |
| 2002/0199194 | A1 | 12/2002 | Ali |
| 2003/0023875 | A1 | 1/2003 | Hursey et al. |
| 2003/0033587 | A1 | 2/2003 | Ferguson et al. |
| 2003/0061287 | A1 | 3/2003 | Yu et al. |
| 2003/0065926 | A1 | 4/2003 | Schultz et al. |
| 2003/0110280 | A1 | 6/2003 | Hinchliffe et al. |
| 2003/0110393 | A1 | 6/2003 | Brock et al. |
| 2003/0110395 | A1 | 6/2003 | Presotto et al. |
| 2003/0115458 | A1 | 6/2003 | Song |
| 2003/0115479 | A1 | 6/2003 | Edwards et al. |
| 2003/0154394 | A1 | 8/2003 | Levin |
| 2003/0167402 | A1 | 9/2003 | Stolfo et al. |
| 2003/0233352 | A1 | 12/2003 | Baker |
| 2004/0015554 | A1 | 1/2004 | Wilson |
| 2004/0039921 | A1 | 2/2004 | Chuang |
| 2004/0103310 | A1 | 5/2004 | Sobel et al. |
| 2004/0117401 | A1 | 6/2004 | Miyata et al. |
| 2004/0117641 | A1 | 6/2004 | Kennedy et al. |
| 2004/0220975 | A1 | 11/2004 | Carpentier et al. |

FOREIGN PATENT DOCUMENTS

| | | |
|---|---|---|
| EP | 1408393 A2 | 4/2004 |
| WO | WO 93/25024 A1 | 12/1993 |
| WO | WO 99/15966 A1 | 4/1999 |
| WO | WO 00/28420 A2 | 5/2000 |
| WO | WO 02/33525 A2 | 4/2002 |

OTHER PUBLICATIONS http://www.networkworld.com/reviews/2002/1104rev.html.*

A Scalable Hybrid Regular Expression Pattern Matcher Moscola, J.; Cho, Y.H.; Lockwood, J.W.; Field-Programmable Custom Computing Machines, 2006. FCCM '06. 14th Annual IEEE Symposium on Apr. 2006 pp. 337-338.*

Parkhouse, Jayne, "Pelican SafeTNet 2.0". [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

Burchell, Jonathan, "NetShield 1.5", Virus Bulletin, Aug. 1994, pp. 21-23, XP 000617453.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <URL: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

* cited by examiner

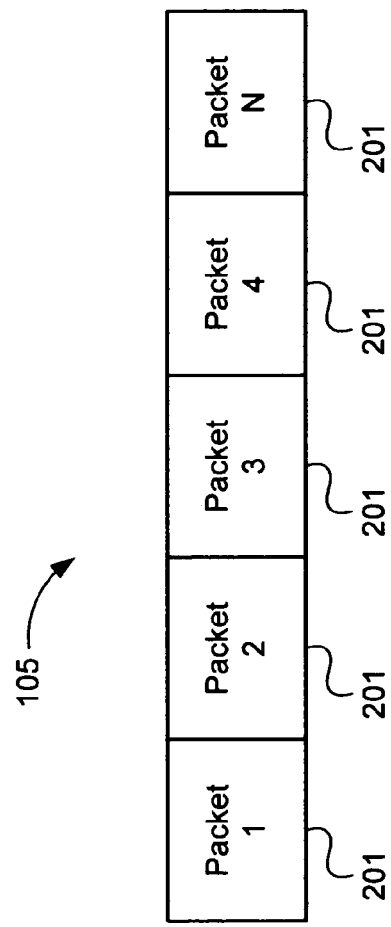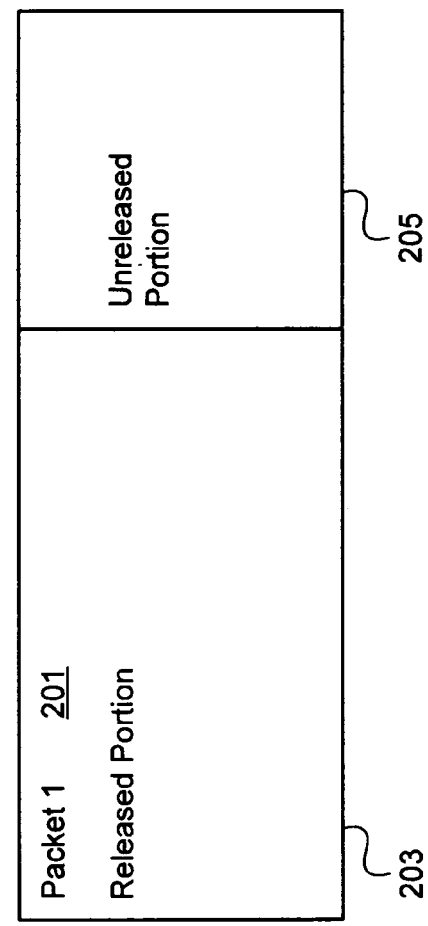

EFFICIENT SCANNING OF STREAM BASED DATA

TECHNICAL FIELD

This invention pertains to the use of a stream manager in order to efficiently scan stream based data by a plurality of scanners.

BACKGROUND ART

It is often desirable to scan data before allowing it into a computer or a computer network. Data can contain undesirable content, such as malicious code (e.g. a computer virus), or content which is not permitted within a specific computing environment (e.g. entertainment material within a business environment). Scanning an inbound stream of data prior to allowing it into a computing environment can detect undesirable content, and either block the entry of the data, or modify the data so as to remove the undesirable content. Similarly, scanning an outbound stream of data prior to allowing it to leave a computing environment can detect and process malicious code originating from that organization's computer network.

It is often desirable for a plurality of scanners to scan an incoming or outgoing data stream. Individual scanners can scan the data stream for specific forms of undesirable content. Some of these scanners are typically read-only scanners, which can scan incoming or outgoing data, but cannot modify it. An example would be a scanner that reads a data stream looking for key words in context, in order to determine whether incoming data contains banned content, such as information concerning sports or entertainment. Such a read-only scanner can block detected banned content from entering or leaving a computing environment.

Some additional scanners are typically modify scanners, meaning that they can, under select circumstances, modify incoming or outgoing data. An example of a modify scanner would be an anti-virus scanner, which can scan incoming or outgoing data in order to look for known computer viruses. Such a scanner could modify the data to remove a detected computer virus, provided that the detected virus is one that the scanner is programmed to remove.

It is often desirable to have the same data stream scanned by multiple modify scanners and by multiple read-only scanners, in order to detect and process multiple varieties of undesirable content. However, because each modify scanner can modify the data, it is necessary that each modify scanner scan the data serially rather than in parallel. Maintenance of data integrity requires that only one scanner write to the data at a time.

Additionally, it can be desirable for a plurality of modify scanners to scan the data in a specific order, so as to scan the data for one type of undesirable content only after it has been scanned and potentially corrected for another.

A problem with the need for serial scanning is latency. Typically, a block of data from an incoming or outgoing stream is cached, and then the entire block is serially scanned by each of a plurality of scanners. Only after this is complete is the block passed along to its destination. This can drastically decrease the speed of data transmission. It is beneficial to transmit data to a destination as quickly as possible. For example, where data is being loaded into a browser from a server, it is clearly undesirable to delay the data transmission. Thus, it is preferable to be able to scan the data and pass it along to the browser as quickly as possible.

It is further desirable to keep as little data cached as necessary, not only to increase the rate of data throughput, but also to minimize the amount of storage media required for the cache.

DISCLOSURE OF THE INVENTION

The present invention comprises methods, systems, and computer readable media for utilizing a stream manager (101) to efficiently scan stream (105) based data (105). One embodiment of an inventive method comprises the steps of:

a stream manager (101) receiving (801) data (103) from a stream (105);

the stream manager (101) making (807) received data (103) serially available to a plurality of modify scanners (109) in a specific order, such that data (103) is made available to a next modify scanner (109) after it has been released by a previous modify scanner (109);

the stream manager (101) making (809) received data (103) available in parallel to a plurality of read-only scanners (111); and the stream manager (101), responsive to data (103) having been released by each modify scanner (109) of the plurality and by each read-only scanner (111) of the plurality, transmitting (515) released data (103) to a destination (113).

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 2A is a block diagram illustrating a portion of a data stream according to some embodiments of the present invention.

FIG. 2B is a block diagram illustrating a data packet with a released portion and an unreleased portion, according to some embodiments of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
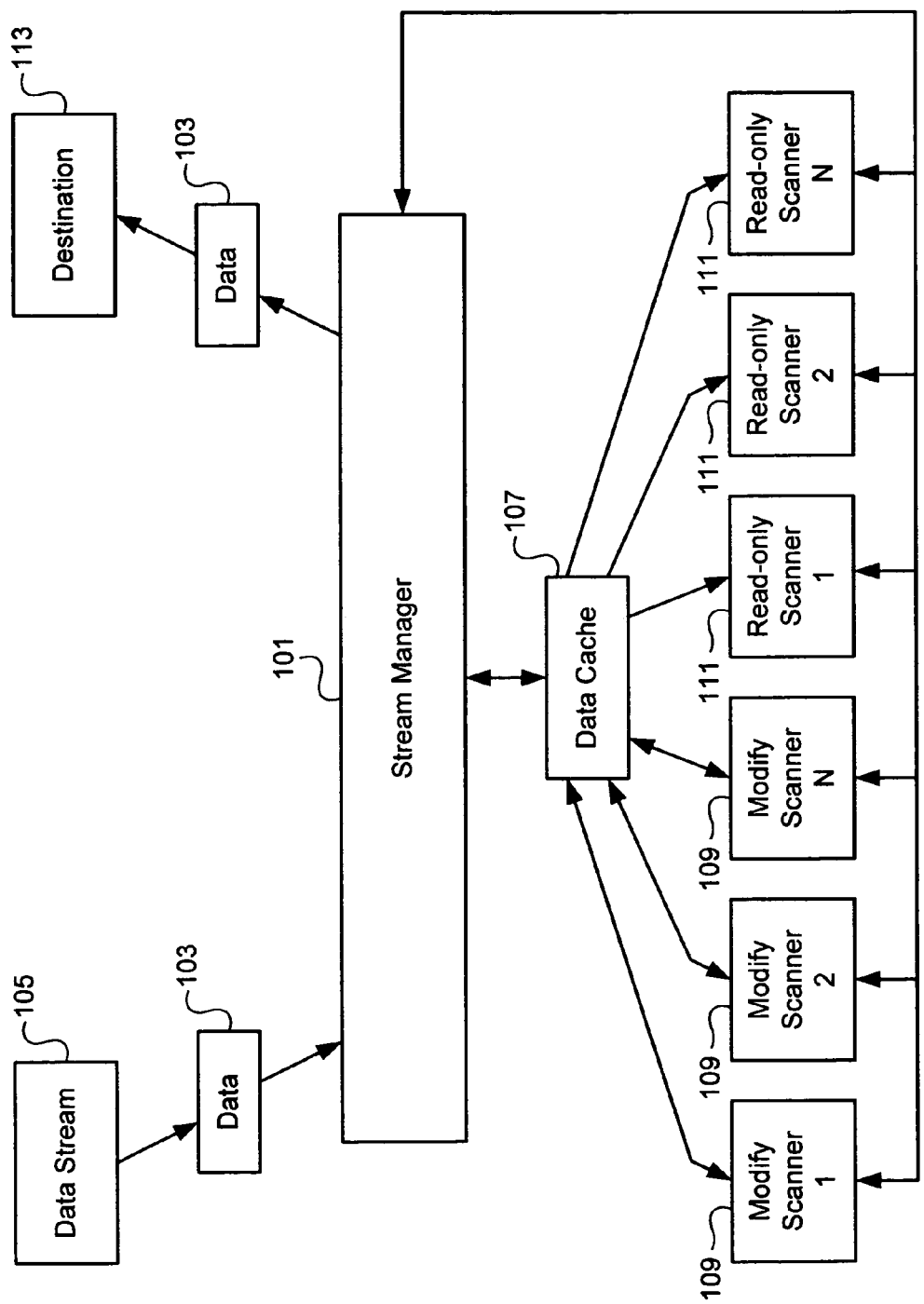
FIG. 1 is a block diagram illustrating a high level overview of one embodiment of the present invention.

FIG. 1 provides a high level overview of one embodiment of the present invention. A stream manager 101 receives data 103 from a data stream 105. The stream manager 101 stores the data 103 in a data cache 107 (in other embodiments the data 103 is not stored in a data cache 107, but in other ways as desired).

The stream manager 101 makes the data 103 serially available to each of a plurality of modify scanners 109 and available in parallel to each of a plurality of read-only scanners 111. Making the data available in parallel where possible (i.e., to the read-only scanners 111) increases the speed of the data 103 throughput.

In some embodiments, the stream manager 101 first makes data 103 serially available to each of the plurality of modify scanners 109 in a specific order, such that data 103 is made available to a next modify scanner 109 only after it has been released by a previous modify scanner 109. It will be understood by those of ordinary skill in the relevant art that the specific order in which data 103 is made available to modify scanners 109 is a design variable, and can comprise any order as desired, including a random or simulated random order.

Once data 103 has been released by each modify scanner 109 of the plurality, the stream manager 101 makes the released data 103 available in parallel to each of the plurality of read-only scanners 111. Once the data 103 has been released by each read-only scanner 111, the stream manager 101 transmits the released data 103 to a destination 113.

In other embodiments, the stream manager 101 first makes data 103 available in parallel to each of the plurality of read-only scanners 111. Once each read-only scanner 111 of the plurality has released data 103, the stream manager makes the released data 103 serially available to each of the plurality of modify scanners 109. Responsive to data 103 having been released by each modify scanner 109, the stream manager 101 transmits the released data 103 to a destination 113.

It will be understood by those of ordinary skill in the relevant art that making data 103 available to a scanner 109, 111 can comprise passing the address of the data 103 to the scanner 109, 111, passing a copy of the data 103 to the scanner 109, 111, or otherwise informing the scanner 109, 111 that the data 103 is available for scanning.

It will further be understood by those of ordinary skill in the relevant art that a scanner 109, 111 releasing data 103 can comprise the scanner 109, 111 sending an indication (e.g. a control signal or a programmatically transmitted value) to the stream manager 101 that the scanner 109, 111 has completed its scanning of the data 103, or need not scan this particular data 103 at all.

FIG. 2A illustrates a portion of a data stream 105 according to some embodiments of the present invention. As illustrated, a data stream 105 can comprise a plurality of discrete data packets 201.

In some embodiments, a stream manager 101 receiving data 103 from a data stream 105 can comprise receiving a data packet 201. In such embodiments, the stream manager 101 making data 103 available to a scanner 109, 111 can comprise making at least a portion of a data packet 201 available.

FIG. 2B illustrates a data packet 201 with a released portion 203 and an unreleased portion 205, according to some embodiments of the present invention. The speed of data 103 throughput can be increased by processing portions of packets 201 where possible, rather than processing only whole packets.

For example, a modify scanner 109 need not release data an entire packet 201 at a time, but can instead release portions 203 of a packet 201. Thus, a first modify scanner 109 can release a portion 203 of a packet 201 as soon as it is done with it, by sending an indication to the stream manager 101. The stream manager 101 can then make the released portion 203 available to the next modify scanner 109, while the first modify scanner 109 scans the unreleased portion 205. Once a portion 203 of a packet 201 has been released by each modify scanner 109, the stream manager 101 can make the released portion 203 available to the plurality of read-only scanners 111 in parallel, or can transmit the released portion 203 to a destination 113 as desired.

Likewise, a read-only scanner 111 can release a portion 203 of a data packet 201, and continue to scan an unreleased portion 203. Once each read-only scanner 111 has released a portion 203 of a packet 201, the stream manager 101 can make the released portion 203 available to the plurality of modify scanners 109 in serial, or can transmit the released portion 201 to a destination 113.

Returning to FIG. 1, in some embodiments of the present invention, the stream manager 101 stores data 103 in a cache 107 as the data 103 is received from the stream 105. The stream manager 101 then removes data 103 from the cache 107 as the data 103 is transmitted to a destination 113. By performing as much scanning in parallel as possible, and by transmitting data 103 to the destination as soon as it has been released by the scanners 109, 111, the present invention allows for the cache 107 to be kept as small as possible.

Figure 3:
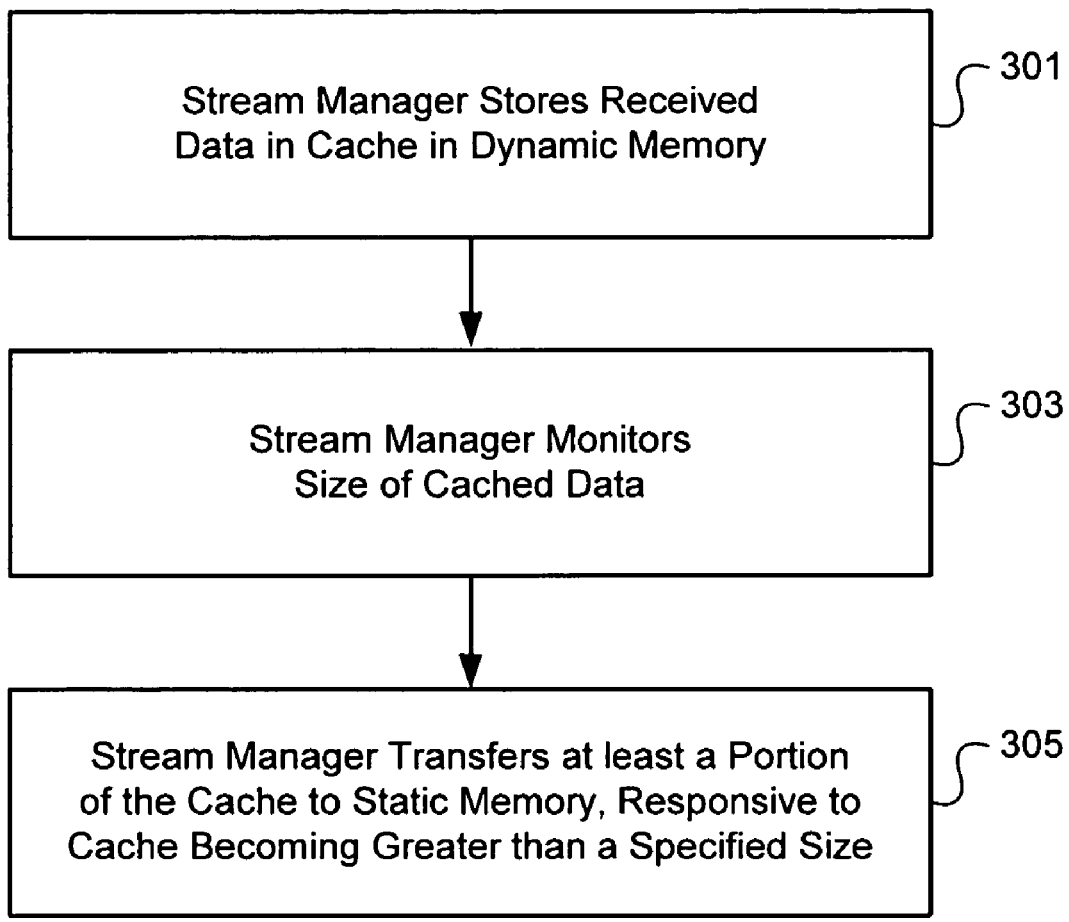
FIG. 3 is a flowchart illustrating steps for performing data cache management, according to some embodiments of the present invention.

In some embodiments of the present invention, the cache 107 is located in dynamic memory, but can be transferred to static memory when it exceeds a specific size. FIG. 3 illustrates steps for performing such an embodiment. The stream manager 101 stores 301 received data 103 in a cache 107 in dynamic memory. The stream manager monitors 303 the size of the cached data 103. Responsive to the cached data 103 becoming greater than a specified size, the stream manager transfers 307 at least a portion of the cached data to static memory. This allows the benefit of the higher speed of dynamic memory, even where a limited amount of dynamic memory is available for caching.

Figure 4:
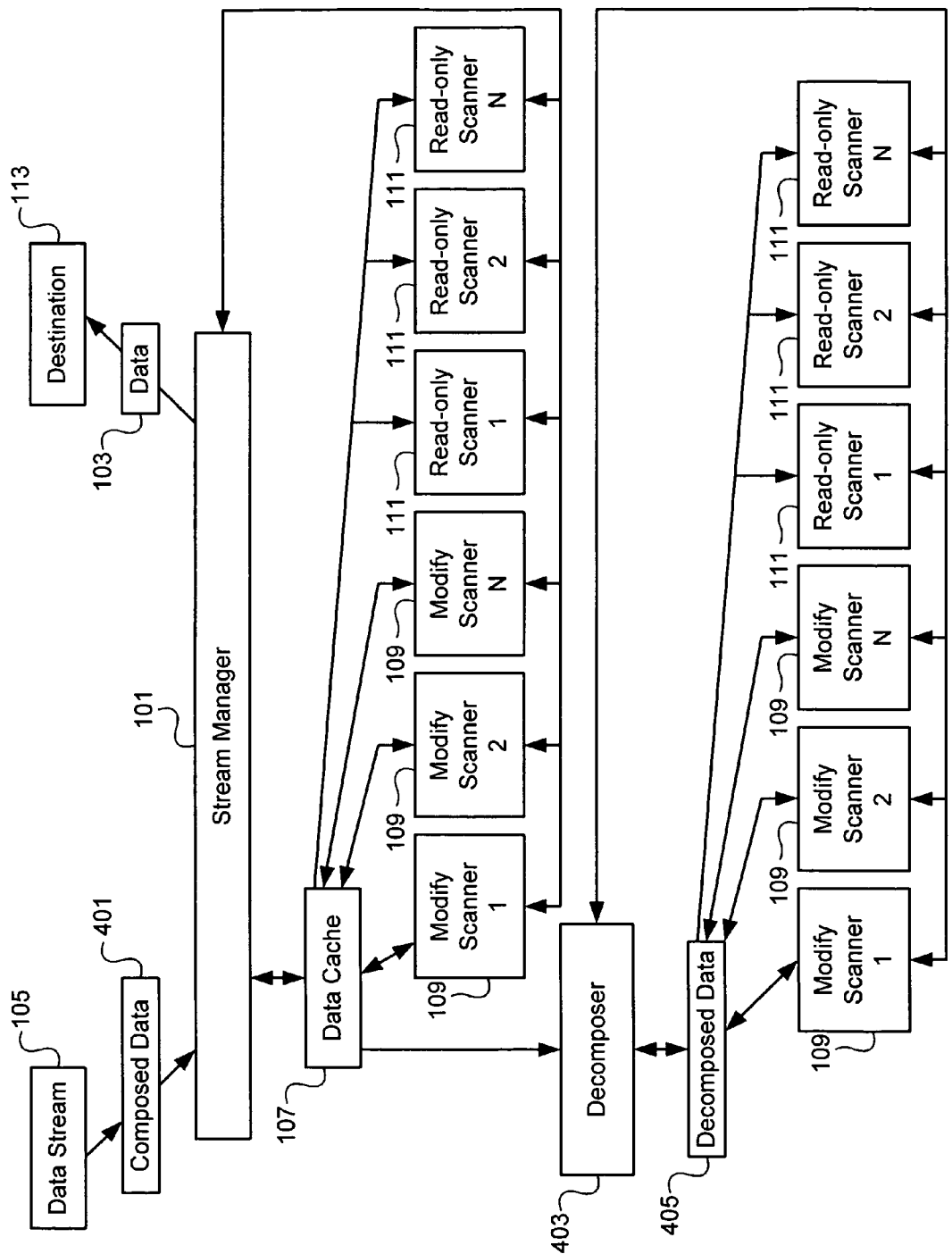
FIG. 4 is a block diagram illustrating a high level overview of another embodiment of the present invention.

FIG. 4 illustrates a high level overview of another embodiment of the present invention. A stream manager 101 receives composed data 401 from a data stream 105. Examples of composed data 401 include compressed or encoded content, such as tar or zip files. Where the stream manager 101 receives composed data 401, it is desirable to scan the data 103 in both its composed and decomposed (e.g. decompressed or decoded) state.

For example, suppose the composed data 401 comprises a self-extracting zip file. The zip file should be decomposed (in this case, unzipped), so that its decomposed contents can be scanned. However, the self extracting zip file itself can also contain undesirable content (e.g., a computer virus that is programmed to execute as the file is unzipped), and thus should also be scanned in its composed state.

In such an embodiment, the stream manager can make the composed data 401 available to a decomposer 403, which can decompose the composed data 401. The decomposer 403 can make the decomposed data 405 available to a plurality of read-only scanners 111 in parallel, and to a plurality of modify scanners 109 in serial. This process is conducted according to above-described logic according to which the stream manager 101 makes data 103 available to the pluralities of scanners 109, 111.

In the embodiment illustrated in FIG. 4, the stream manager 101 also makes the composed data 401 available to a plurality of read-only scanners 111 in parallel, and to a plurality of modify scanners 109 in serial, as described above in the description of the embodiment illustrated by FIG. 1. It will be readily apparent to one of ordinary skill in the relevant art that composed data 401 and decomposed data 405 can be scanned in either order, or simultaneously, as desired.

Responsive to data 103 in its decomposed form 405 and its composed form 401 having been released by each read-only scanner 111 and by each modify scanner 109, the data 103 is transmitted to a destination 113.

It will be readily apparent to one of ordinary skill in the relevant art that the functionality described above concerning processing data packets 201 and released 203 and unreleased portions 205 thereof, as well as the functionality described above concerning data cache 107 management, are within the scope of the embodiment illustrated by FIG. 4 as well.

Figure 5:
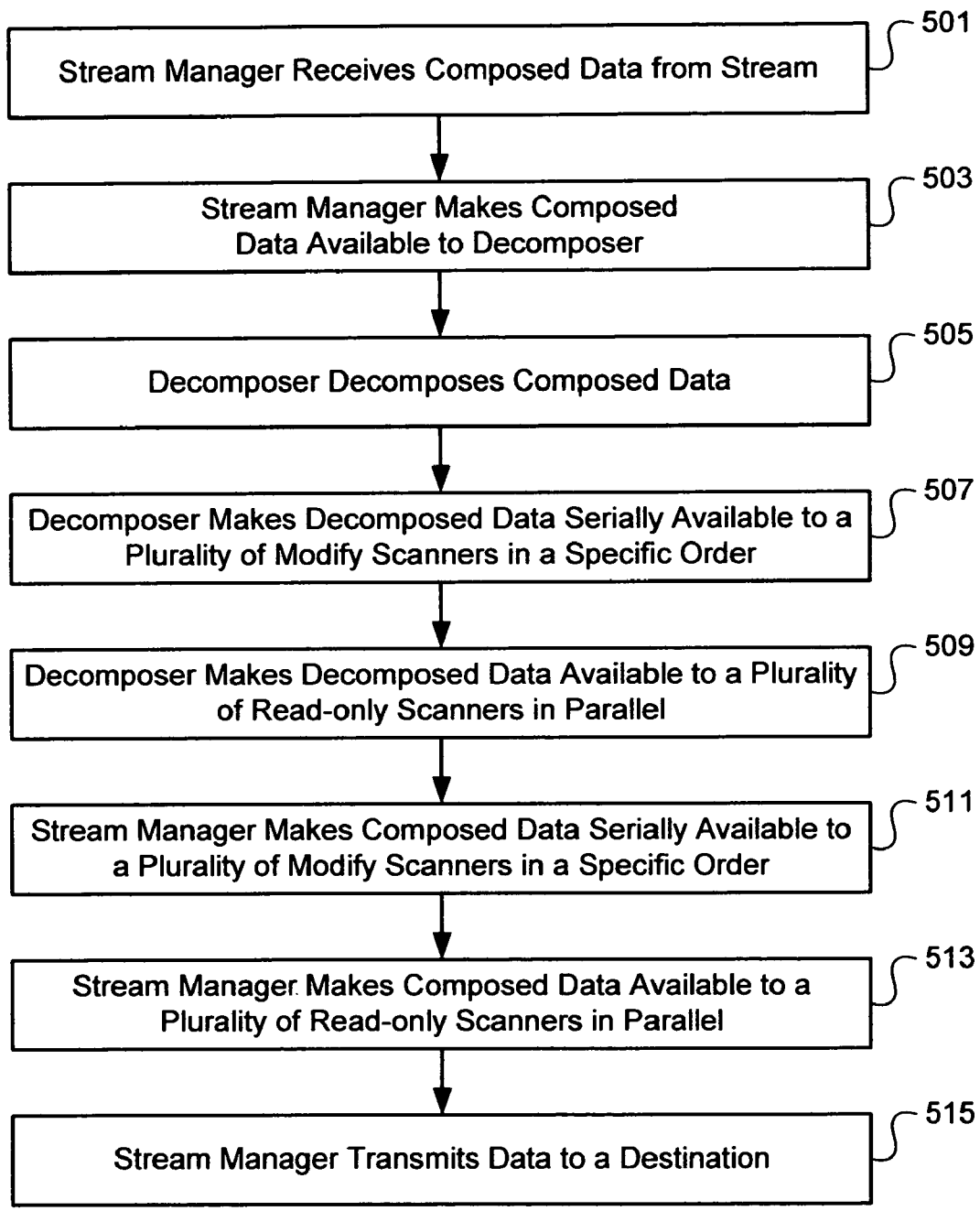
FIG. 5 is a flowchart, illustrating steps for processing composed data according to some embodiments of the present invention.

FIG. 5 illustrates steps for processing composed data 401 according to some embodiments of the present invention. A stream manager 101 receives 501 composed data 401 from a data stream 105. The stream manager 101 makes 503 composed data 401 available to a decomposer 403. The decomposer 403 decomposes 505 the composed data 401. The decomposer 403 makes 507 the decomposed data 405 serially available to a plurality of modify scanners 109 in a specific order, and makes 509 the decomposed data 405 available to a plurality of read-only scanners 111 in parallel. It will be understood by those of ordinary skill in the relevant art that steps 507 and 509 can be performed in either order. In other words, in some embodiments step 507 is performed first, and in others step 509 is performed first.

The stream manager 101 makes 511 the composed data 401 serially available to a plurality of modify scanners 109 in a specific order, and makes 513 the composed data 401 available to a plurality of read-only scanners 111 in parallel. As with steps 507 and 509, steps 511 and 513 can be performed in either order. Furthermore, steps 507 and 509 can be performed before, after or simultaneously with steps 511 and 513. In other words, the composed data 401 and decomposed data 405 can be scanned simultaneously, or in either order as desired.

Once the scanners 109, 111 have released the data 103 in its composed state 401 and decomposed state 405, the stream manager transmits 515 the released data 103 to a destination 113.

Figure 6:
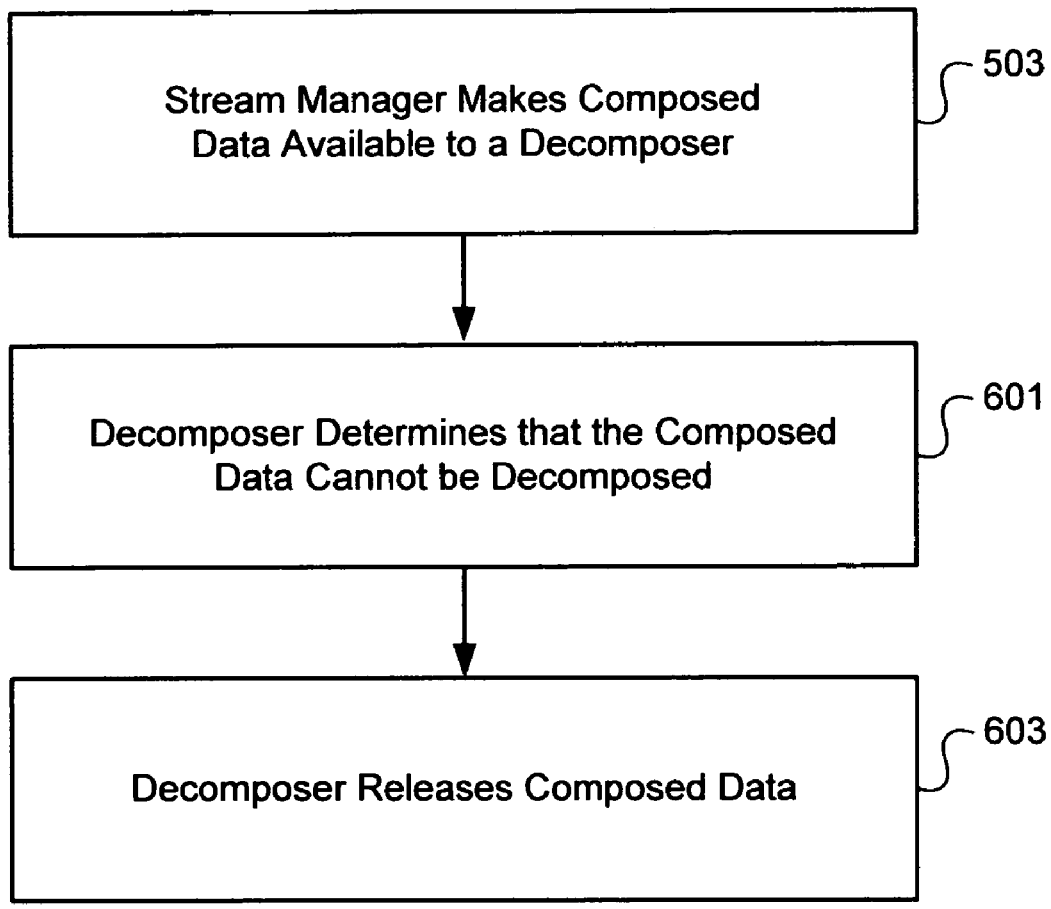
FIG. 6 is a flowchart illustrating steps for processing composed data under certain circumstances, according to some embodiments of the present invention.

In some instances, the decomposer 403 will be unable to decompose 505 composed data 401, for example because the composed data 401 is in a format that the decomposer 403 has not been programmed to process. FIG. 6 illustrates steps for processing composed data 401 under such circumstances, according to some embodiments of the present invention.

The stream manager 101 makes 503 composed data 401 available to a decomposer 403. The decomposer 403 determines 601 that the composed data 401 cannot be decomposed 505. The decomposer 403 releases 603 the composed data 401. Under such circumstances, the stream manager can still ensure that the composed data 401 is scanned.

Figure 7:
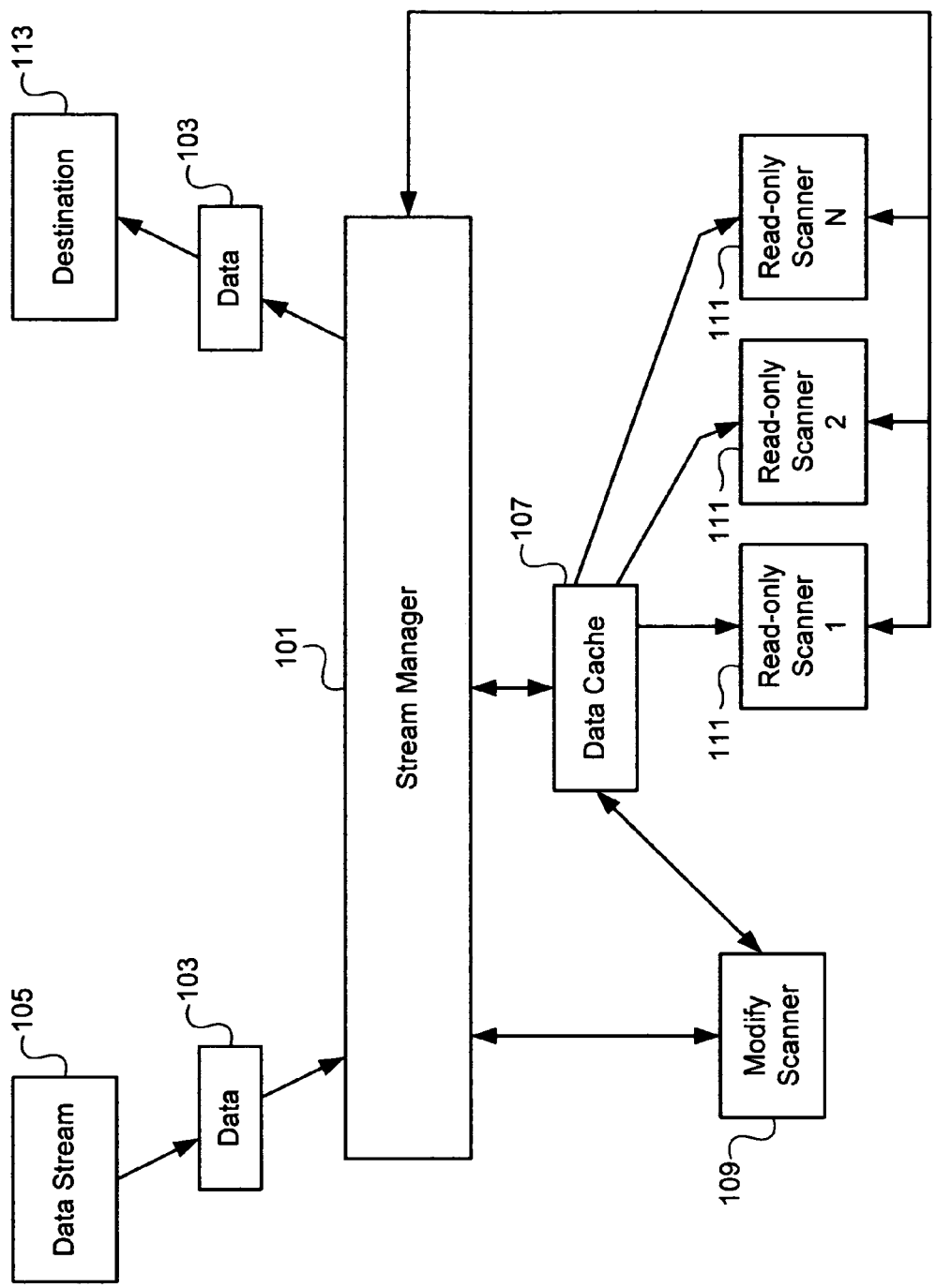
FIG. 7 is a block diagram illustrating a high level overview of another embodiment of the present invention.

FIG. 7 illustrates a high level overview of another embodiment of the present invention. A stream manager 101 receives data 103 from a data stream 105, and stores the data 103 in a cache 107 (or in other embodiments stores the data 103 another way).

In the embodiment illustrated by FIG. 7, there is a plurality of read-only scanners 111, but only a single modify scanner 109. Therefore, the stream manager 101 can make the data 103 available to all of the scanners 109, 111 in parallel, because there is no possibility of two modify scanners 109 trying to write to the data 103 simultaneously.

Responsive to data 103 having been released by the modify scanner 109 and each of the plurality of read-only scanners, the stream manager 101 transmits the released data 103 to a destination 113.

It will be readily apparent to one of ordinary skill in the relevant art that the functionality described above concerning processing data packets 201 and released 203 and unreleased portions 205 thereof, as well as the functionality described above concerning data cache 107 management, are within the scope of the embodiment illustrated by FIG. 7 as well.

Figure 8:
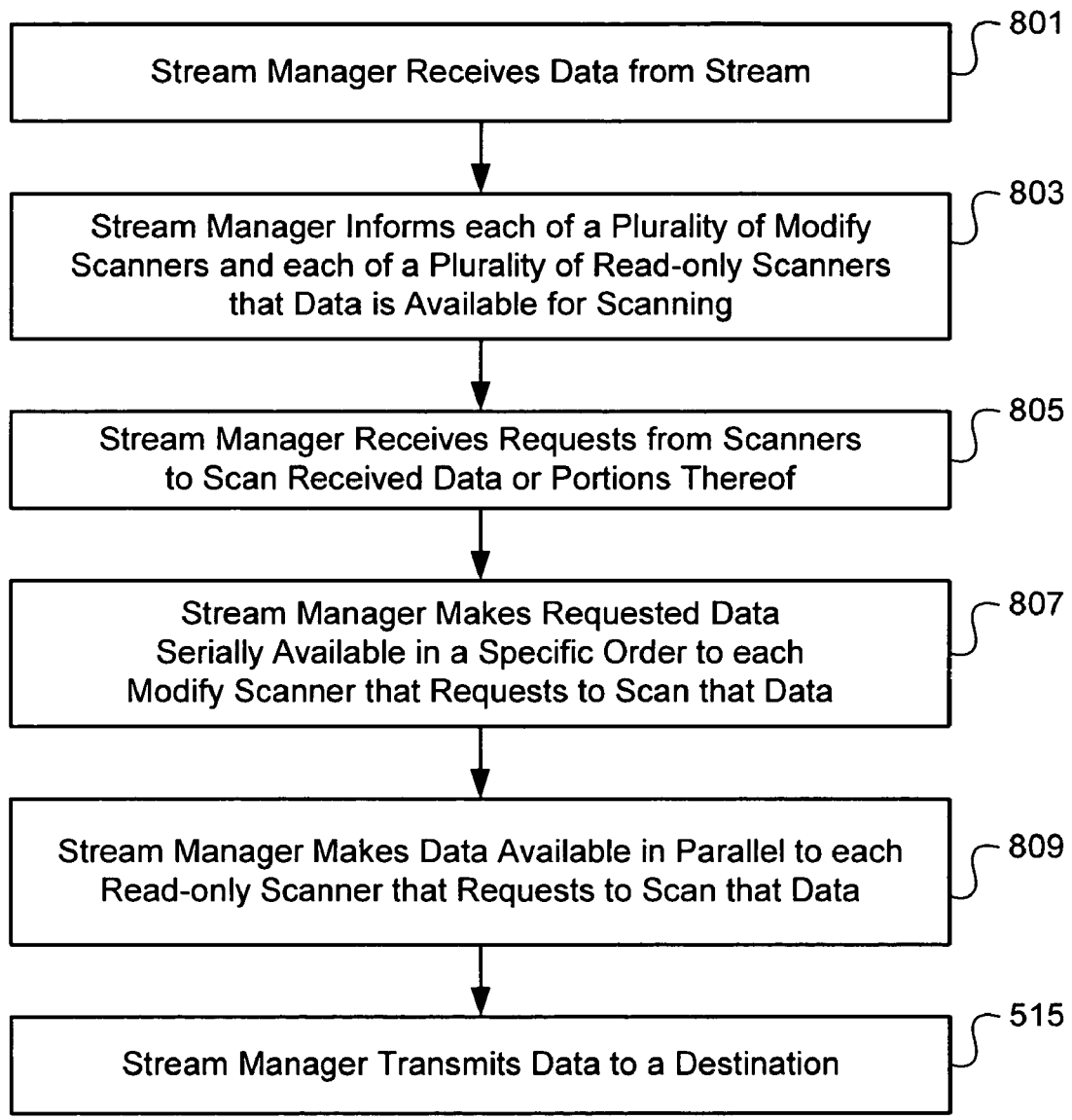
FIG. 8 is a flowchart illustrating steps for efficiently scanning stream based data, according to other embodiments of the present invention.

FIG. 8 illustrates steps for efficiently scanning stream based data, according to other embodiments of the present invention. A stream manager 101 receives 801 data 103 from a stream 105. The stream manager 101 informs 803 each of a plurality of modify scanners 109 and each of a plurality of read-only scanners 111 that received data 103 is available for scanning. The stream manager 101 receives 805 requests from scanners 109, 111 to scan the received data 103, or portions thereof. It is to be understood that if a scanner 109, 111 does not request to scan specific received data 103, it is not necessary for that scanner 109, 111 to scan that data 103 prior to the stream manager 101 transmitting that data 103 to a destination 113.

The stream manager 101 makes 807 requested data 103 serially available in a specific order to each modify scanner 109 that requests to scan that data 103. The stream manager 101 also makes 809 requested data 103 available in parallel to each read-only scanner 111 that requests to scan that data 103. It will be understood by those of ordinary skill in the relevant art that steps 807 and 809 can be performed in either order. In other words, in some embodiments step 807 is performed first, and in others step 809 is performed first.

The stream manager 101, responsive to data 103 having been released by each modify scanner 109 that requests to scan that data 103 and by each read-only scanner 111 that requests to scan that data 103, transmits 515 the released data 103 to a destination 113.

It will be readily apparent to one of ordinary skill in the relevant art that the functionality described above concerning processing data packets 201 and released 203 and unreleased portions 205 thereof, the functionality described above concerning data cache 107 management, and the functionality described above concerning processing composed data 401 are within the scope of the embodiments illustrated by FIG. 8 as well.

Figure 9:
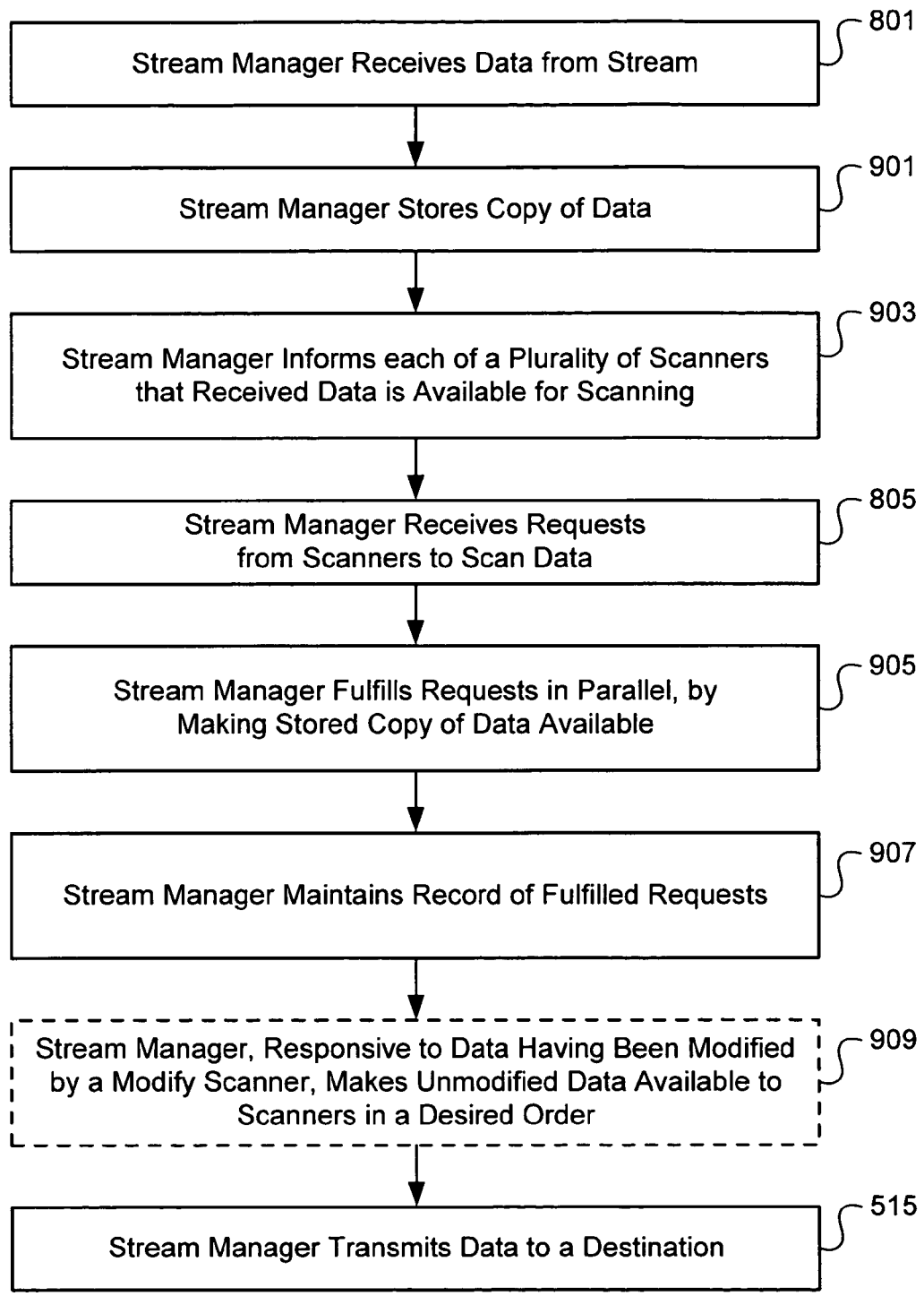
FIG. 9 is a flowchart illustrating steps for efficiently scanning stream based data, according to yet other embodiments of the present invention.

FIG. 9 illustrates steps for efficiently scanning stream based data, according to yet other embodiments of the present invention. These embodiments leverage the fact that modify scanners 109 will often not modify data 103. In these embodiments, the stream manager 101 assumes that no modify scanner 109 will actually modify data 103, and thus allows all scanners 109, 111 to scan in parallel, in order to increase the speed of data 103 throughput. Only when a modify scanner 109 actually does modify a unit of data 103 is it necessary for that data 103 to be rescanned in order to ensure data integrity.

As illustrated in FIG. 9, a stream manager 101 receives 801 data 103 from a stream 105. The stream manager 101 stores 901 a copy of the received data 103, and informs 903 each of a plurality of scanners 109, 111 that received data 103 is available for scanning. The stream manager 101 receives 805 requests from scanners 109, 111 to scan received data 103. The stream manager 101 fulfills 905 received requests in parallel, by making the stored copy of received data 103 available to each scanner 109, 111 that requests to scan that received data 103. The stream manager maintains 907 a record of fulfilled requests.

In some instances, a modify scanner 109 will modify a specific unit of data 103 (e.g. a packet 201). Under such circumstances, the stream manager 101, responsive to that data 103 having been modified by a modify scanner 109, makes the unmodified original version of that data 103 available in a desired order to each scanner 109, 111 that requests to scan that data 103. Then, the stream manager 101, responsive to data 103 having been released by each scanner 109, 111 that requests to scan that data 103, transmits 515 the released data 103 to a destination 113.

Under other circumstances, no modify scanner 109 will actually modify a given unit of data 103, in which case no rescanning of that unit of data 103 will be necessary. Thus, the stream manager 101, responsive to that data 103 not having been modified by any modify scanner 109, and responsive to that data 103 having been released by each scanner 109, 111 that requests to scan that data 103, transmits 515 the released data 103 to a destination 113. This technique of "speculative scanning," i.e. presenting a copy of the data 103 to all scanners 109 (including modify scanners 109) in parallel under the assumption that no modify scanner 109 will actually modify the data 103, can be applicable to all embodiments of the present invention, including those discussed elsewhere in this specification.

As will be understood by those familiar with the art, the invention may be embodied in other specific forms without departing from the spirit or essential characteristics thereof. Likewise, the particular naming and division of the modules, features, attributes, methodologies and other aspects are not mandatory or significant, and the mechanisms that implement the invention or its features may have different names, divisions and/or formats. Furthermore, as will be apparent to one of ordinary skill in the relevant art, the modules, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method of efficiently scanning stream based data, the method comprising:
a stream manager receiving data from a stream;
the stream manager making received data serially available to a plurality of modify scanners in a specific order, such that data is made available to a next modify scanner after it has been released by a previous modify scanner;
the stream manager making received data available in parallel to a plurality of read-only scanners;
the stream manager, responsive to data having been released by each modify scanner of the plurality and by each read-only scanner of the plurality, transmitting released data to a destination.

2. The method of claim 1, wherein:
receiving data from a stream further comprises receiving a packet of data from a stream; and
making data available to a scanner further comprises making at least a portion of the packet of data available to the scanner.

3. The method of claim 1, further comprising:
the stream manager receiving an indication from a modify scanner that the modify scanner has released at least a portion of a packet of data; and
the stream manager making the released data available to a next modify-scanner.

4. The method of claim 1, further comprising:
the stream manager receiving, from each modify scanner of the plurality, an indication that the modify scanner has released at least a portion of a packet of data;
the stream manager making the data that has been released by each modify scanner of the plurality available in parallel to each of a plurality of read-only scanners;
the stream manager receiving, from each read-only scanner of the plurality, an indication that the read-only scanner has released at least a portion of a packet of data; and
the stream manager transmitting the data that has been released by each read-only scanner of the plurality to a destination.

5. The method of claim 1, further comprising:
the stream manager receiving, from each read-only scanner of the plurality, an indication that read-only scanner has released at least a portion of a packet of data;
the stream manager making the data that has been released by each read-only scanner of the plurality serially available to each of a plurality of modify scanners in a specific order, such that data is made available to a next modify scanner after it has been released by a previous modify scanner;
the stream manager receiving, from each modify scanner of the plurality, an indication that modify scanner has released at least a portion of a packet of data; and
the stream manager transmitting the data that has been released by each modify scanner of the plurality to a destination.

6. The method of claim 1, wherein making data available to a scanner further comprises:
passing an address of the data to the scanner.

7. The method of claim 1, wherein making data available to a scanner further comprises:
passing a copy of the data to the scanner.

8. The method of claim 1, further comprising:
the stream manager storing data in a cache as the data is received from the stream; and
the stream manager removing data from the cache as the data is transmitted to a destination.

9. The method of claim 8, wherein:
the cache is located in dynamic memory.

10. The method of claim 8, wherein:
the cache is located in static memory.

11. The method of claim 8, wherein:
the cache is located in dynamic memory; and the method further comprises:
the stream manager monitoring the size of the cache; and
the stream manager transferring at least a portion of the cache to static memory responsive to the cache becoming greater than a specified size.

12. The method of claim 1, wherein:
receiving data from a stream further comprises receiving composed data from a stream; and the method further comprises:
the stream manager making received data available to a decomposer;
the decomposer decomposing the composed data;
the decomposer making decomposed data serially available to a plurality of modify scanners in a specific order, such that data is made available to a next modify scanner after it has been released by a previous modify scanner; and
the decomposer making decomposed data available in parallel to a plurality of read-only scanners.

13. The method of claim 1, wherein:
receiving data from a stream further comprises receiving composed data from a stream; and the method further comprises:
the stream manager making received data available to a decomposer;
the decomposer determining that the composed data cannot be decomposed; and
the decomposer releasing the composed data.

14. A computer implemented method of efficiently scanning stream based data, the method comprising:
a stream manager receiving data from a stream;
the stream manager making received data available in parallel to a single modify scanner, and to a plurality of read-only scanners;
the stream manager, responsive to data having been released by the modify scanner and each read-only scanner of the plurality, transmitting released data to a destination.

15. The method of claim 14, wherein:
receiving data from a stream further comprises receiving a packet of data from a stream; and
making data available to a scanner further comprises making at least a portion of the packet of data available to the scanner.

16. The method of claim 14, further comprising:
the stream manager receiving, from the modify scanner, and from each read-only scanner of the plurality, an indication that the read-only scanner has released at least a portion of a packet of data; and
the stream manager transmitting the data that has been released by the modify scanner and by each read-only scanner of the plurality to a destination.

17. The method of claim 14, further comprising:
the stream manager storing data in a cache as the data is received from the stream; and
the stream manager removing data from the cache as the data is transmitted to a destination.

18. The method of claim 17, wherein:
the cache is located in dynamic memory; and the method further comprises:
the stream manager monitoring the size of the cache; and
the stream manager transferring at least a portion of the cache to static memory responsive to the cache becoming greater than a specified size.

19. A computer implemented method of efficiently scanning stream based data, the method comprising:
a stream manager receiving data from a stream;
the stream manager informing each of a plurality of modify scanners and each of a plurality of read-only scanners that received data is available for scanning;
the stream manager receiving requests from scanners to scan received data;
the stream manager making data serially available in a specific order to each modify scanner that requests to scan that data;
the stream manager making data available in parallel to each read-only scanner that requests to scan that data; and
the stream manager, responsive to data having been released by each modify scanner that requests to scan that data and by each read-only scanner that requests to scan that data, transmitting released data to a destination.

20. The method of claim 19, wherein:
receiving data from a stream further comprises receiving composed data from a stream; and the method further comprises:
the stream manager making received data available to a decomposer;
the decomposer decomposing the composed data;
the decomposer informing each of a plurality of modify scanners and each of a plurality of read-only scanners that decomposed data is available for scanning;
the decomposer receiving requests from scanners to scan decomposed data;
the decomposer making decomposed data serially available in a specific order to each modify scanner that requests to scan that data; and
the decomposer making decomposed data available in parallel to each read-only scanner that requests to scan that data.

21. The method of claim 19, wherein:
receiving data from a stream further comprises receiving composed data from a stream; and the method further comprises:
the stream manager making received data available to a decomposer;
the decomposer determining that the composed data cannot be decomposed; and
the decomposer releasing the composed data.

22. The method of claim 19, wherein:
receiving data from a stream further comprises receiving a packet of data from a stream; and
making data available to a scanner further comprises making at least a portion of the packet of data available to the scanner.

23. The method of claim 19, further comprising:
the stream manager receiving an indication from a modify scanner that the modify scanner has released at least a portion of a packet of data; and
the stream manager making the released data available to a next modify-scanner.

24. The method of claim 19, further comprising:
the stream manager receiving, from each modify scanner that requests to scan a packet of data, an indication that the modify scanner has released at least a portion of the packet of data;

the stream manager making the data that has been released by each modify scanner available in parallel to each read-only scanner that requests to scan that data;

the stream manager receiving, from each read-only scanner that requests to scan that data, an indication that the read-only scanner has released at least a portion of the packet of data; and the stream manager transmitting the data that has been released by each read-only scanner to a destination.

25. The method of claim 19, further comprising:

the stream manager receiving, from each read-only scanner that requests to scan a packet of data, an indication that the read-only scanner has released at least a portion of the packet of data;

the stream manager making the data that has been released by each read-only scanner serially available in a specific order to each modify scanner that requests to scan that data;

the stream manager receiving, from each modify only scanner that requests to scan that data, an indication that the modify scanner has released at least a portion of the packet of data; and the stream manager transmitting the data that has been released by each modify scanner to a destination.

26. The method of claim 19, further comprising:

the stream manager storing data in a cache as the data is received from the stream; and the stream manager removing data from the cache as the data is transmitted to a destination.

27. The method of claim 26, wherein:

the cache is located in dynamic memory; and the method further comprises:

the stream manager monitoring the size of the cache; and the stream manager transferring at least a portion of the cache to static memory responsive to the cache becoming greater than a specified size.

28. A computer implemented method of efficiently scanning stream based data, the method comprising:

a stream manager receiving data from a stream;

the stream manager storing a copy of received data;

the stream manager informing each of a plurality of scanners that received data is available for scanning;

the stream manager receiving requests from scanners to scan received data;

the stream manager fulfilling received requests in parallel, by making a stored copy of received data available to each scanner that requests to scan that received data; and the stream manager maintaining a record of fulfilled requests.

29. The method of claim 28, further comprising the stream manager, responsive to data having been modified by a modify scanner, making an unmodified original version of that data available in a desired order to each scanner that requests to scan that data; and the stream manager, responsive to data having been released by each scanner that requests to scan that received data, transmitting released data to a destination.

30. The method of claim 28, further comprising the stream manager, responsive to received data not having been modified by any modify scanner, and responsive to data having been released by each scanner that requests to scan that received data, transmitting released data to a destination.

31. A computer readable medium containing a computer program product for efficiently scanning stream based data, the computer program product comprising:

program code for receiving data from a stream;

program code for making received data serially available to a plurality of modify scanners in a specific order, such that data is made available to a next modify scanner after it has been released by a previous modify scanner;

program code for making received data available in parallel to a plurality of read-only scanners; and program code for transmitting released data to a destination, responsive to data having been released by each modify scanner of the plurality, and by each read-only scanner of the plurality.

32. The computer program product of claim 31, further comprising:

program code for receiving a packet of data from a stream; and program code for making at least a portion of the packet of data available to the scanner.

33. The computer program product of claim 31, further comprising:

program code for receiving an indication from a modify scanner that the modify scanner has released at least a portion of a packet of data; and program code for making the released data available to a next modify-scanner.

34. The computer program product of claim 31, further comprising:

program code for receiving, from each modify scanner of the plurality, an indication that the modify scanner has released at least a portion of a packet of data;

program code for making the data that has been released by each modify scanner of the plurality available in parallel to each of a plurality of read-only scanners;

program code for receiving, from each read-only scanner of the plurality, an indication that the read-only scanner has released at least a portion of a packet of data; and program code for transmitting the data that has been released by each read-only scanner of the plurality to a destination.

35. The computer program product of claim 31, further comprising:

program code for receiving, from each read-only scanner of the plurality, an indication that the read-only scanner has released at least a portion of a packet of data;

program code for making the data that has been released by each read-only scanner of the plurality serially available to each of a plurality of modify scanners in a specific order, such that data is made available to a next modify scanner after it has been released by a previous modify scanner;

program code for receiving, from each modify scanner of the plurality, an indication that the modify scanner has released at least a portion of a packet of data; and program code for transmitting the data that has been released by each modify scanner of the plurality to a destination.

36. The computer program product of claim 31, further comprising:

program code for receiving composed data from a stream;

program code for making received data available to a decomposer;

program code for decomposing the composed data by the decomposer;

program code for making decomposed data serially available to a plurality of modify scanners in a specific order, such that data is made available to a next modify scanner after it has been released by a previous modify scanner; and program code for making decomposed data available in parallel to a plurality of read-only scanners.

37. The computer program product of claim 31, further comprising:

program code for receiving composed data from a stream;

program code for making received data available to a decomposer;

program code for determining, by the decomposer, that the composed data cannot be decomposed; and program code for releasing the composed data by the decomposer.

38. A computer readable medium containing a computer program product for efficiently scanning stream based data, the computer program product comprising:

program code for receiving data from a stream;

program code for informing each of a plurality of modify scanners and each of a plurality of read-only scanners that received data is available for scanning;

program code for receiving requests from scanners to scan received data;

program code for making received data serially available in a specific order to each modify scanner that requests to scan that data;

program code for making received data available in parallel to each read-only scanner that requests to scan that data; and program code for transmitting released data to a destination, responsive to data having been released by each modify scanner that requests to scan that data and by each read-only scanner that requests to scan that data.

39. The computer program product of claim 38, further comprising:

program code for receiving a packet of data from a stream; and program code for making at least a portion of the packet of data available to the scanner.

40. The computer program product of claim 38, further comprising:

program code for receiving an indication from a modify scanner that the modify scanner has released at least a portion of a packet of data; and program code for making the released data available to a next modify-scanner.

41. The computer program product of claim 38, further comprising:

program code for receiving, from each modify scanner that requests to scan a packet of data, an indication that the modify scanner has released at least a portion of the packet of data;

program code for making the data that has been released by each modify scanner available in parallel to each read-only scanner that requests to scan that data;

program code for receiving, from each read-only scanner that requests to scan that data, an indication that the read-only scanner has released at least a portion of the packet of data; and program code for transmitting the data that has been released by each read-only scanner that requests to scan that data to a destination.

42. The computer program product of claim 38, further comprising:

program code for receiving, from each read-only scanner that requests to scan a packet of data, an indication that the read-only scanner has released at least a portion of the packet of data;

program code for making the data that has been released by each read-only scanner of the plurality serially available in a specific order to each modify scanner that requests to scan that data;

program code for receiving, from each modify scanner that requests to scan that data, an indication that the modify scanner has released at least a portion of the packet of data; and program code for transmitting the data that has been released by each modify scanner that requests to scan that data to a destination.

43. A computer readable medium containing a computer program product for efficiently scanning stream based data, the computer program product comprising:

program code for receiving data from a stream;

program code for storing a copy of received data;

program code for informing each of a plurality of scanners that received data is available for scanning;

program code for receiving requests from scanners to scan received data;

program code for fulfilling received requests in parallel, by making a stored copy of received data available to each scanner that requests to scan that received data; and program code for maintaining a record of fulfilled requests.

44. The computer program product of claim 43, further comprising program code for, responsive to data having been modified by a modify scanner, making an unmodified original version of that data available in a desired order to each scanner that requests to scan that data; and program code for transmitting released data to a destination, responsive to data having been released by each scanner that requests to scan that received data.

45. The computer program product of claim 43, further comprising program code for transmitting released data to a destination, responsive to received data not having been modified by any modify scanner, and responsive to data having been released by each scanner that requests to scan that received data.

46. A system for efficiently scanning stream based data, the system comprising:

a reception module, for receiving data from a stream;

a data management module, for making received data serially available to a plurality of modify scanners in a specific order, such that data is made available to a next modify scanner after it has been released by a previous modify scanner, and for making received data available in parallel to a plurality of read-only scanners, the data management module being communicatively coupled to the reception module; and a transmission module, for transmitting released data to a destination, responsive to data having been released by each modify scanner of the plurality and by each read-only scanner of the plurality, the transmission module being communicatively coupled to the data management module.

47. The system of claim 46, further comprising:

a decomposing module, for decomposing received composed data, the decomposing module being communicatively coupled to the data management module; and a decomposed data management module, for making decomposed data serially available to a plurality of modify scanners in a specific order, such that data is made available to a next modify scanner after it has been released by a previous modify scanner, and for making decomposed data available in parallel to a plurality of read-only scanners, the decomposed data management module being communicatively coupled to the decomposing module.

48. A system for efficiently scanning stream based data, the system comprising:
    a data reception module, for receiving data from a stream;
    a scanner interface module, for informing each of a plurality of modify scanners and each of a plurality of read-only scanners that received data is available for scanning, and for receiving requests from scanners to scan received data, the scanner interface module being communicatively coupled to the data reception module;
    a data management module, for making received data serially available in a specific order to each modify scanner that requests to scan that data, and for making received data available in parallel to each read-only scanner that requests to scan that data, the data management module being communicatively coupled to the scanner interface module; and
    a data transmission module for transmitting released data to a destination, responsive to data having been released by each modify scanner and each read-only scanner that requests to scan that data, the data transmission module being communicatively coupled to the data management module.

49. A system for efficiently scanning stream based data, the system comprising:
    a data reception module for receiving data from a stream;
    a data storage module for storing a copy of received data, the data storage module being communicatively coupled to the data reception module;
    a scanner interface module for informing each of a plurality of scanners that received data is available for scanning, and for receiving requests from scanners to scan received data, the scanner interface module being communicatively coupled to the data reception module;
    a data management module for fulfilling received requests in parallel, by making a stored copy of received data available to each scanner that requests to scan that received data, the data management module being communicatively coupled to the scanner interface module; and
    a record maintenance module, for maintaining a record of fulfilled requests, the record maintenance module being communicatively coupled to the data management module.

50. The system of claim 49, wherein:
    the data management module is further for, responsive to data having been modified by a modify scanner, making an unmodified original version of that data available in a desired order to each scanner that requests to scan that data; and the system further comprises
    a transmission module, for transmitting released data to a destination, responsive to data having been released by each scanner that requests to scan that received data, the transmission module being communicatively coupled to the data management module.

51. The system of claim 49, further comprising
    a transmission module, for transmitting released data to a destination, responsive to received data not having been modified by any modify scanner, and responsive to data having been released by each scanner that requests to scan that received data, the transmission module being communicatively coupled to the data management module.

52. A system for efficiently scanning stream based data, the method comprising:
    means for a stream manager receiving data from a stream;
    means for the stream manager making received data serially available to a plurality of modify scanners in a specific order, such that data is made available to a next modify scanner after it has been released by a previous modify scanner;
    means for the stream manager making received data available in parallel to a plurality of read-only scanners; and
    means for the stream manager transmitting released data to a destination, responsive to data having been released by each modify scanner of the plurality, and by each read-only scanner of the plurality.

53. The system of claim 52, further comprising:
    means for the stream manager making received composed data available to a decomposer;
    means for the decomposer decomposing the composed data;
    means for the decomposer making decomposed data serially available to a plurality of modify scanners in a specific order, such that data is made available to a next modify scanner after it has been released by a previous modify scanner; and
    means for the decomposer making decomposed data available in parallel to a plurality of read-only scanners.

54. A system for efficiently scanning stream based data, the method comprising:
    means for a stream manager receiving data from a stream;
    means for the stream manager informing each of a plurality of modify scanners and each of a plurality of read-only scanners that received data is available for scanning;
    means for the stream manager receiving requests from scanners to scan received data;
    means for the stream manager making received data serially available in a specific order to each modify scanner that requests to scan that data;
    means for the stream manager making received data available in parallel to each read-only scanner that requests to scan that data; and
    means for the stream manager transmitting released data to a destination, responsive to data having been released by each modify scanner that requests to scan that data, and by each read-only scanner that requests to scan that data.

* * * * *